_(12)_ United States Patent
Hoffmann et al.

(10) Patent No.: US 10,245,591 B2
(45) Date of Patent: Apr. 2, 2019

(54) BEARING ELEMENT SUITABLE FOR SUPPORTING A GRINDING TABLE IN A ROLLER MILL

(71) Applicant: Gebr. Pfeiffer SE, Kaiserslautern (DE)

(72) Inventors: Dirk Hoffmann, Trippstadt (DE); Ralf Frankenberger, Kaiserslautern (DE); Karl-Heinz Schütte, Trippstadt (DE)

(73) Assignee: GEBR. PFEIFFER SE, Kaiserslautern (DE)

( * ) Notice: Subject to any disclaimer, the term of this patent is extended or adjusted under 35 U.S.C. 154(b) by 0 days.

(21) Appl. No.: 15/730,346

(22) Filed: Oct. 11, 2017

(65) Prior Publication Data

US 2018/0099288 A1   Apr. 12, 2018

(30) Foreign Application Priority Data

Oct. 12, 2016   (DE) .......................... 10 2016 119 377

(51) Int. Cl.

| | |
|---|---|
| *F16C 27/08* | (2006.01) |
| *F16C 27/06* | (2006.01) |
| *F16C 17/03* | (2006.01) |
| *F16C 33/10* | (2006.01) |
| *B02C 15/00* | (2006.01) |
| *F01D 25/16* | (2006.01) |

(Continued)

(52) U.S. Cl.
CPC ............ *B02C 15/006* (2013.01); *B02C 15/00* (2013.01); *B02C 15/003* (2013.01); *F01D 25/168* (2013.01); *F16C 17/035* (2013.01); *F16C 17/065* (2013.01); *F16C 27/08* (2013.01); *F16C 33/06* (2013.01); *F16C 33/108* (2013.01)

(58) Field of Classification Search
CPC ...... F16C 17/035; F16C 17/065; F16C 27/08; F16C 33/06; F16C 33/108; B02C 15/003; B02C 15/006; F01D 25/168
USPC .......... 384/91, 105, 121, 129, 420, 428, 440
See application file for complete search history.

(56) References Cited

U.S. PATENT DOCUMENTS

| | | | |
|---|---|---|---|
| 6,354,741 B1 * | 3/2002 | Saville .................. | F16C 17/042 384/105 |
| 8,678,658 B2 * | 3/2014 | New ..................... | F16C 17/035 384/122 |
| 9,482,274 B2 * | 11/2016 | Ertas ................... | F16C 32/0622 |

(Continued)

FOREIGN PATENT DOCUMENTS

| | | | | |
|---|---|---|---|---|
| CA | 2697279 C | * | 9/2015 | ............. F16C 17/03 |
| DE | 3931116 A1 | | 3/1991 | |

(Continued)

*Primary Examiner* — Marcus Charles
(74) *Attorney, Agent, or Firm* — Roberts Mlotkowski Safran Cole & Calderon, P.C.

(57) ABSTRACT

A bearing element suitable for supporting a grinding disk in a roller mill, comprising a plate-like or disk-shaped base element, an annular disk and a spacer element, wherein the annular disk is disposed substantially parallel to the base element and at a distance from the base element, and is connected at its bottom using an annular spacer element with the base element, and the annular disk has means on its upper side for receiving the axial bearing segments, whereby the spacer element is designed as an annular strip extending in the axial direction and has a plurality of spaced-apart arches in the circumferential direction, whose openings point towards the base element.

10 Claims, 5 Drawing Sheets

(51) Int. Cl.
*F16C 33/06* (2006.01)
*F16C 17/06* (2006.01)

(56) References Cited

U.S. PATENT DOCUMENTS

| | | | | |
|---|---|---|---|---|
| 2010/0237621 | A1* | 9/2010 | Tessier | F16C 17/03 290/52 |
| 2012/0020598 | A1* | 1/2012 | New | F16C 17/035 384/122 |
| 2013/0161475 | A1* | 6/2013 | Nelson | B02C 15/00 248/636 |
| 2014/0321779 | A1* | 10/2014 | Park | F16C 17/10 384/105 |
| 2016/0146248 | A1* | 5/2016 | Ertas | F16C 32/0622 384/105 |

FOREIGN PATENT DOCUMENTS

| | | | | |
|---|---|---|---|---|
| DE | 102010007929 | A1 | 8/2011 | |
| DE | 102014000549 | A1 * | 7/2015 | ............. B02C 15/04 |
| JP | 10234154 | A * | 9/1998 | ............. H02K 5/167 |
| JP | 2003222123 | A * | 8/2003 | ............. F16C 17/047 |

* cited by examiner

BEARING ELEMENT SUITABLE FOR SUPPORTING A GRINDING TABLE IN A ROLLER MILL

RELATED APPLICATION

This application claims priority to DE 10 2016 119 377.1 filed Oct. 12, 2016, the contents of which are incorporated by reference in its entirety.

FIELD OF THE INVENTION

The present invention relates to a bearing element suitable for supporting a grinding table in a roller mill, comprising a plate-shaped or disk-shaped base element, a ring element and a spacer element. Further, the present invention relates to drive arrangement for a grinding table the driving arrangement having such a bearing element.

BACKGROUND OF THE INVENTION

Roller mills comprise a rotatable grinding table and grinding rollers rolling thereupon. In order to turn the grinding table, either the grinding table or the grinding rollers can be driven.

In both cases, it is necessary to accommodate the axial forces occurring in the process in axial bearings.

As described, for example, in DE 39 31 116 A1, the pressure forces acting in the axial direction are taken up by axial thrust bearings, which are supported on a base.

Axial thrust bearings usually consist of a plurality of axial bearing segments, arranged circularly side by side.

For reasons of manufacture, the base can have unevenness that leads to differences in height between individual axial bearing segments. As a result, the lubrication gaps on individual axial bearing segments differ in size. However, the lubricating film thickness influences the load bearing capacity of a single axial bearing segment. Thus, an increase in the thickness of the lubricating gap leads to an enormous reduction in the load bearing capacity of a single axial bearing segment.

Further, individual axial bearing segments can also have different heights due to manufacturing tolerances, which also leads to the fact that the lubricating gap thickness differs from axial bearing segment to axial bearing segment.

Various possibilities have already been suggested for compensating the differences in height between the individual axial bearing segments. Height-adjustable or elastic bearing elements have been proposed.

For example, DE 10 2010 007 929 A1 describes an elastic bearing element.

DE 10 2010 007 929 A1 discloses in detail an annular base element, which can be mounted on a base or support element and which comprises a base body that can be connected to the base or support element and a hollow ring element. The hollow ring element protrudes beyond the base body. Several axial sliding bearing segments are arranged on the ring element. The stiffness of the ring element is selected in such a way that unevenness in the base is compensated so as to avoid negative influences from the unevenness of the base on the lubricating gap.

The assembly described in DE 10 2010 007 929 A1 has a relatively complex structure. Further, the axial loads lead to bending or membrane stresses instead of simple pressure stresses. Further, the described assembly is difficult to adapt to a different segment number and other kind of forces.

BRIEF SUMMARY OF THE INVENTION

It is an object of the present invention to provide a bearing element, which is suitable for supporting a grinding table in a roller mill, which is easy to produce and can be easily adapted to different segment numbers and segment sizes. In particular, it is an object of the present invention to provide a bearing element, whose elastic behaviour can easily be adapted to desired conditions.

According to the invention, the object is solved by a bearing element suitable for supporting a grinding table in a roller mill, comprising a plate-like or disk-shaped base element, an annular disk and a spacer element; the annular disk being arranged substantially parallel to the base element and at a distance from the base element is connected to the base element on its underside by means of the spacer element and has means for receiving axial bearing segments on its upper side, wherein the spacer element is designed as an annular strip extending in the axial direction and has a plurality of spaced-apart arches in the circumferential direction, the opening of the arches pointing out in the direction of the base element.

The bearing element is simple and inexpensive to manufacture. In addition, it can be flexibly used for a variety of different requirements, since the axial bearing segments can be distributed on the annular disk depending on the requirements.

The number and/or the size of the axial bearing segments, as well as the spacing between the axial bearing segments and the position of the axial bearing segments among each other with respect to the underlying arches of the spacer element, can in particular vary for an adaptation to different mill sizes and loads.

It is advantageous that the number of arches of the spacer element corresponds to the number of axial bearing segments, which are mounted on the ring element. This allows optimum distribution of the forces occurring in axial direction.

According to a preferred embodiment, the plurality of spaced arches is designed in the shape of arcades. Arcade-shaped arches are to be understood as a series of arches supported by pillars or columns.

It is further preferred for the spacer element to have at least one pillar, the length of the pillar is greater in the circumferential direction than its thickness in the radial direction. This arrangement has been beneficial, in order to uniformly absorb the axial forces.

To avoid stress concentrations, it is preferred that the spacer element has at least one pillar with a side wall, which is enlarged outwards in the area of the base element. In this case, it has proved to be particularly advantageous that in the area of the base element the side wall is enlarged in the shape of an arcade, in particular it is enlarged concavely outwards.

In order to make a particularly space-saving drive-arrangement for a grinding table, which drive-arrangement according to the invention has a bearing element, it is advantageous that the bearing element has a radial bearing dome.

For fixing the annular disk, it is preferred that a plurality of ribs extending in radial direction from the radial bearing dome is provided.

At this, it is preferred that a rib has a rib arm extending from the radial bearing dome, which is connected to the annular disk. Thus, on the one hand, it is ensured that the annular disk does not tilt under load, and on the other hand, it is prevented that the ribs extending in radial direction from the radial bearing dome influence the axial stiffness of the bearing element.

The subject matter of the present invention is also a drive arrangement for a grinding table, the drive arrangement comprising a bearing element according to one of the preceding claims.

BRIEF DESCRIPTION OF THE DRAWINGS

Preferred embodiments are explained in more detail with reference to the accompanying drawings, wherein.

DETAILED DESCRIPTION OF THE INVENTION

Figure 1:
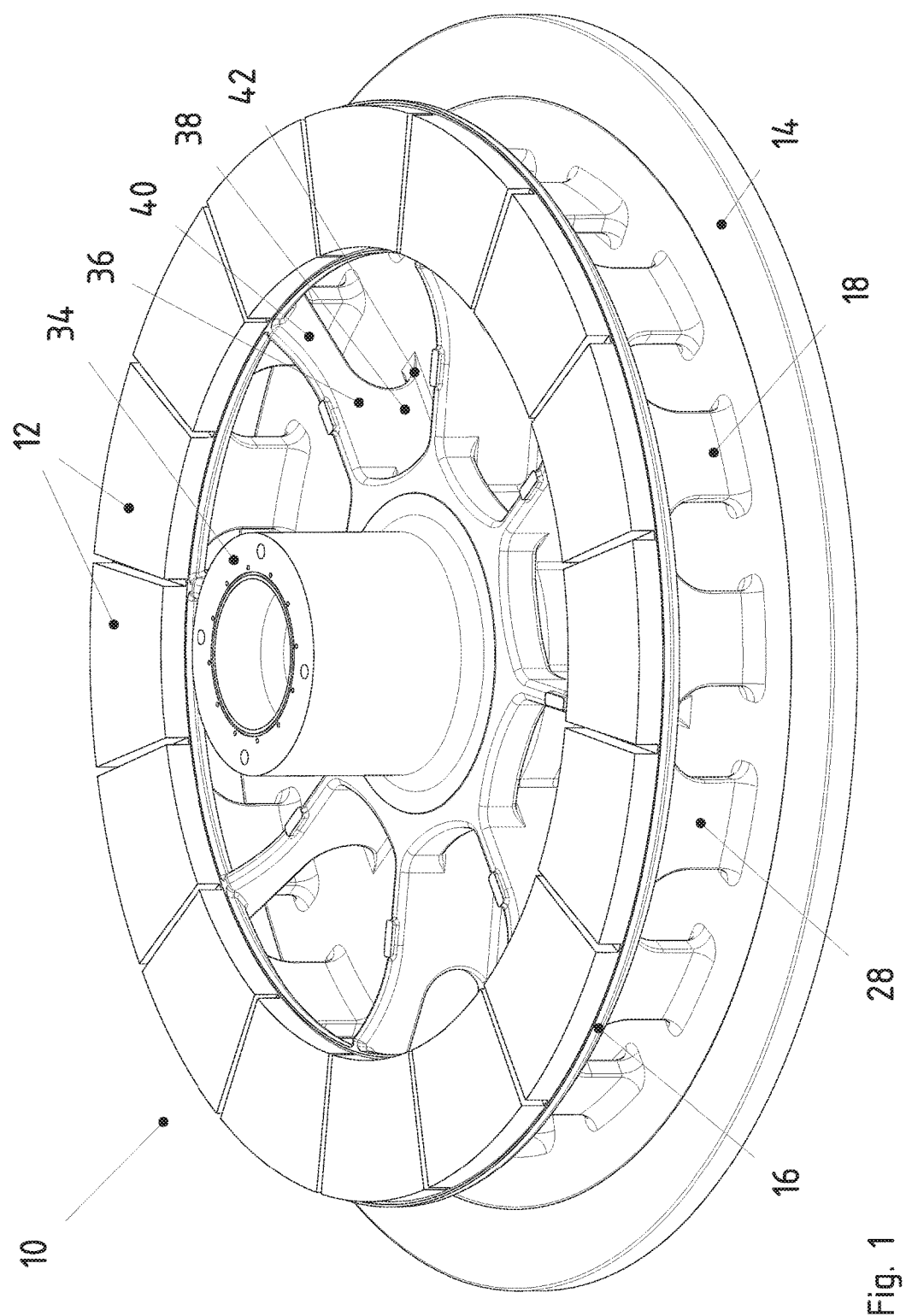
FIG. 1 shows a perspective view of a bearing element with axial bearing segments.

FIG. 1 shows a bearing element 10, which is suitable for supporting a grinding table in a roller mill, together with individual axial bearing segments 12 in a perspective view.

Figure 2:
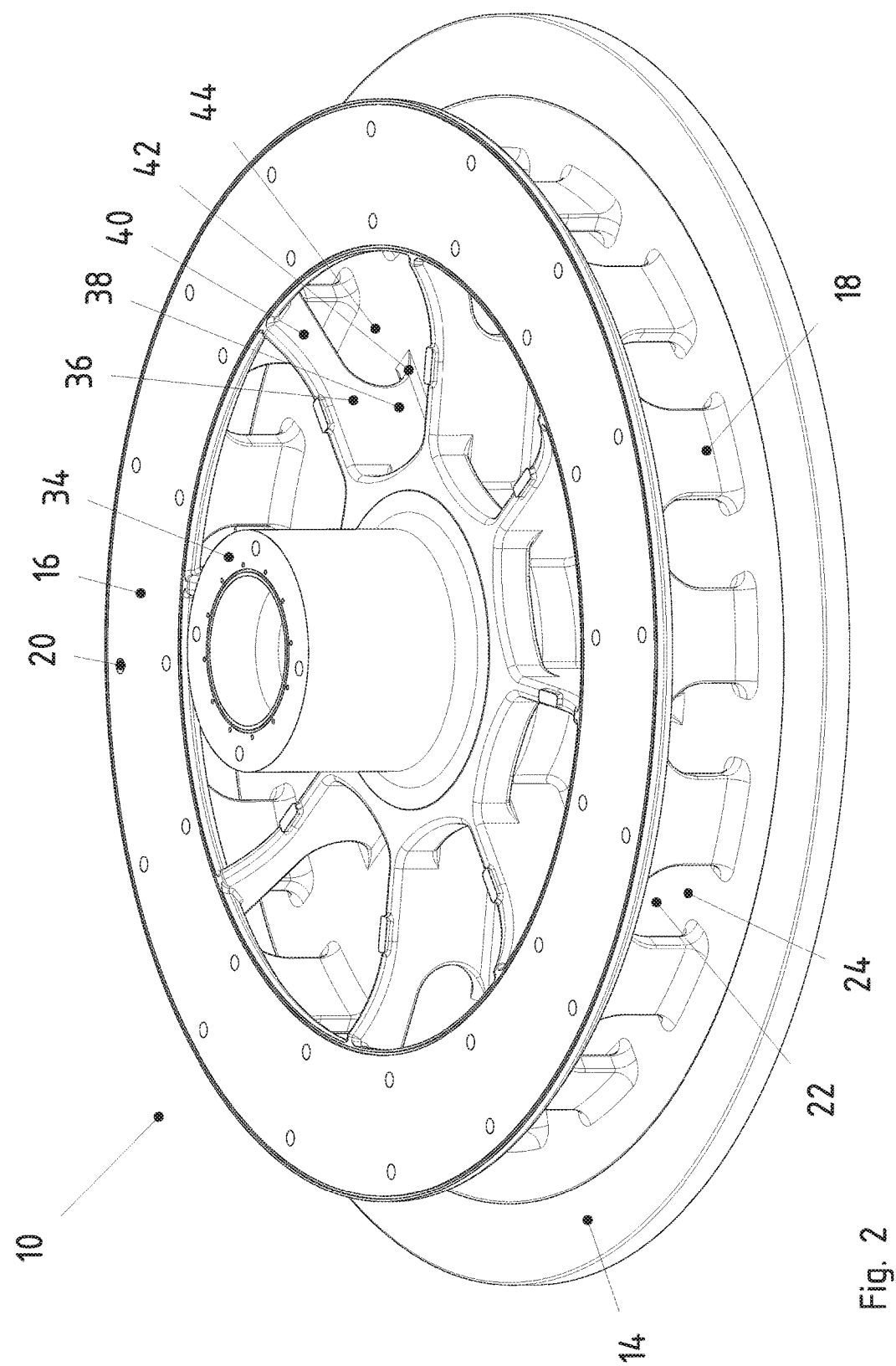
FIG. 2 shows a perspective view of a bearing element as shown in FIG. 1 without axial bearing segments.

As can be seen from FIG. 2, the bearing element 10 comprises a disk-shaped base element 14, an annular disk 16 and a spacer element 18.

The base element 14 can be mounted on a support (not shown) or on a base. In the embodiment shown, the base element 14 is designed in the shape of a disk. However, it is not absolutely necessary for the base element to be designed as a round disk. It can also have a different shape such as, for example, an angular plate, wherein an opening can also be provided in the centre of the plate-shaped or disk-shaped base element.

The annular disk 16 is arranged substantially parallel and at a distance from the base element 14 and is connected at its underside by means of the spacer element 18 to the base element 14. On the upper side of the annular disk 16, there are means for receiving axial bearing elements in the form of bores 20.

The number and position of the bores 20 is adapted to the number of the axial bearing segments 12, which are to be arranged on the annular disk 16. The axial bearing segments 12 are preferably arranged equidistantly and at a small distance from one another on the annular disk 16.

The spacer element 18 is also formed annularly and extends in the axial direction in a cylindrical manner, wherein the annular disk 16 and the spacer element 18 have a common axis so that the spacer element 18 has the form of a circulating belt or strip.

Figure 3:
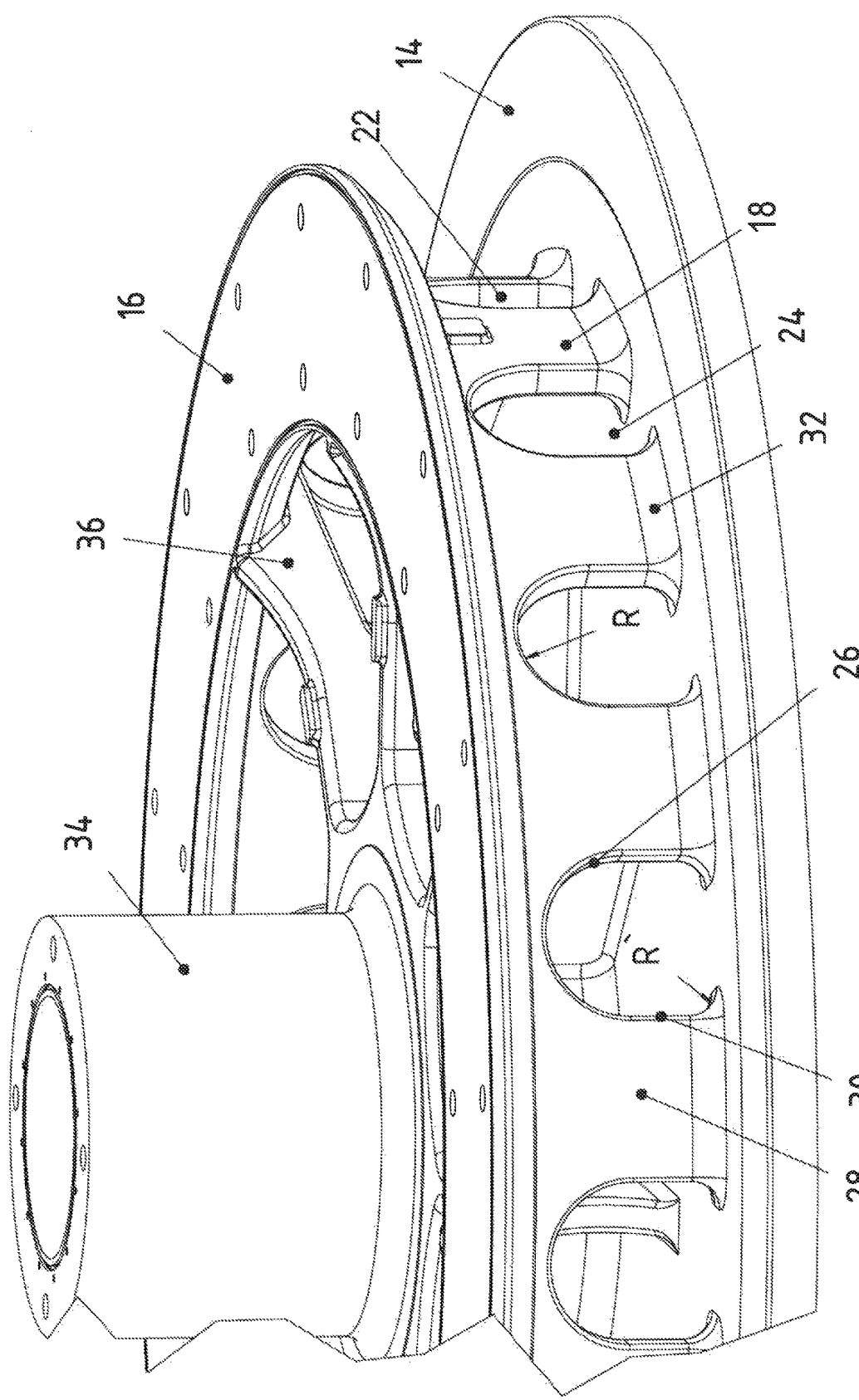
FIG. 3 shows a perspective view of the bearing element of FIG. 2 from the side.

A plurality of arches 22 in the shape of arcades that are spaced-apart are provided in the spacer element 18 in circumferential direction, the arches 22 having openings 24, which point towards the direction of the base element 14 (see in particular FIG. 3). The opening 24 of an arch 22 is delimited by a circular segment-shaped arch element 26 with a radius R as well as by a pillar 28 of the arch the pillar 28 having a rectilinear pillar section 30 and a pillar base 32 secured to the base element 14. The circular-shaped arch element 26 leads in the opening 24 on both sides to the rectilinear pillar section 30 (see in particular, FIG. 3).

The pillar base 32 secured to the base element 14 has a curvature with a radius R' which turns outwards, in particular concavely, on all side walls of the pillar 28.

Figure 4:
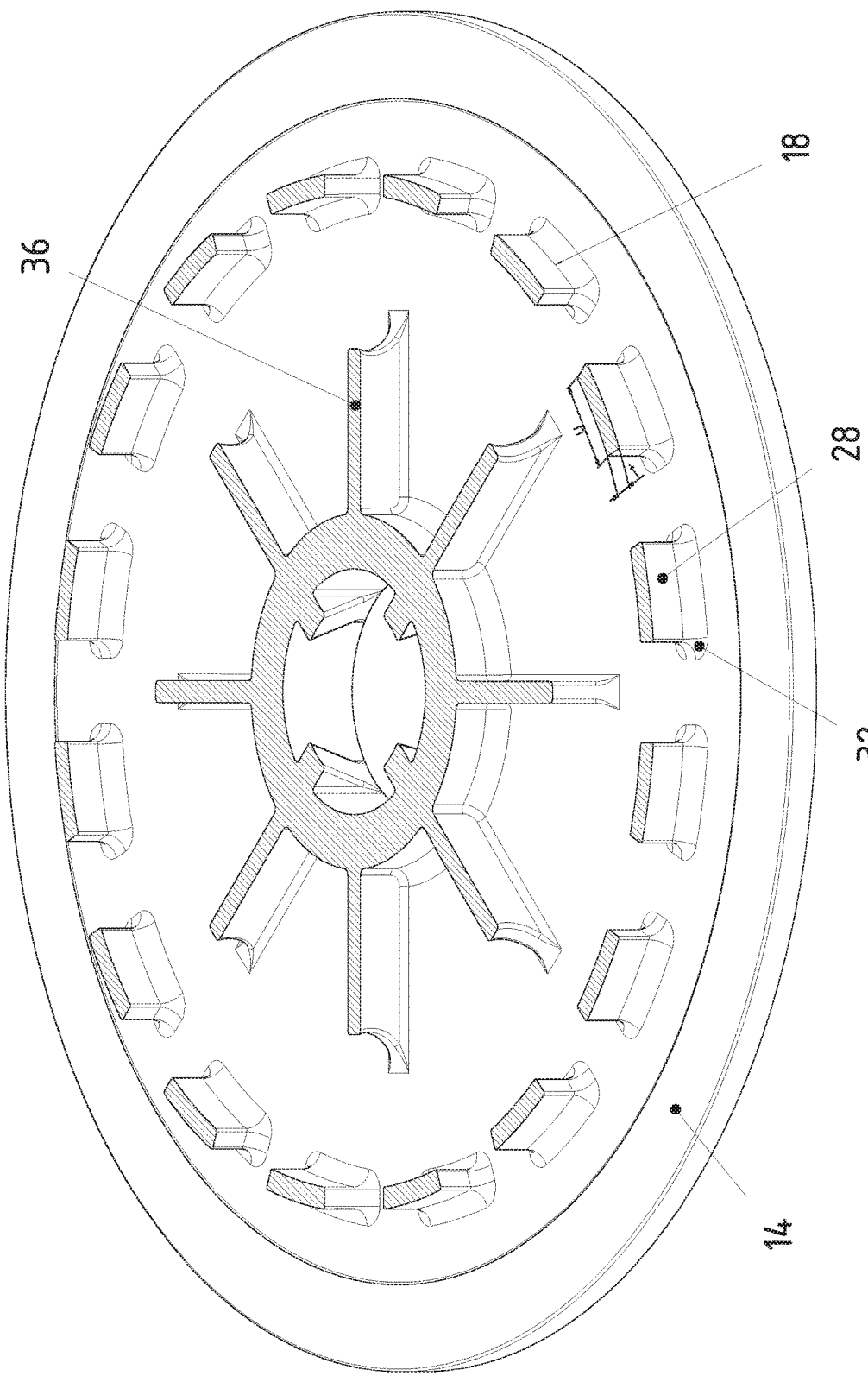
FIG. 4 shows a cross-section through the bearing element and FIG. 5 shows a plan view of the bearing element with axial bearing segments.

As can be seen in FIG. 4, the pillar 28 of the spacer element 18 has a length u in the circumferential direction, which is greater than a thickness t in the radial direction.

The openings 24 of the arches 22 all have the same shape and are arranged equidistant in the spacer element 18 along the circumference of the spacer element 18, wherein the distance between individual openings 24 approximately corresponds to the length of the pillar 28 in the circumferential direction.

The geometry of the arches 22 can be varied to adjust the desired axial stiffness of the bearing element 10. For example, the width and height of an opening 24, the radius R and the length of the circular-shaped arch element 26, the cross-sectional shape of the pillar 28, in particular the length u and the thickness t of the pillar 28, and the curvature of the pillar base 32 can be altered. The contour of the opening 24 can also be designed parabolic-shaped. Further, the number of openings 24 and the distance between the openings 24 can be adapted to different requirements. Finally, it is also possible to combine arches of different geometries.

The spacer element 18 is fastened at its front side centrally to the underside of the annular disk 16.

A radial bearing dome 34 is provided on the base element 14 concentrically to the common axis of the annular disk 16 and the spacer element 18. The radial bearing dome 34 serves to receive a radial bearing and has a significantly smaller diameter than the annular disk 16.

Figure 5:
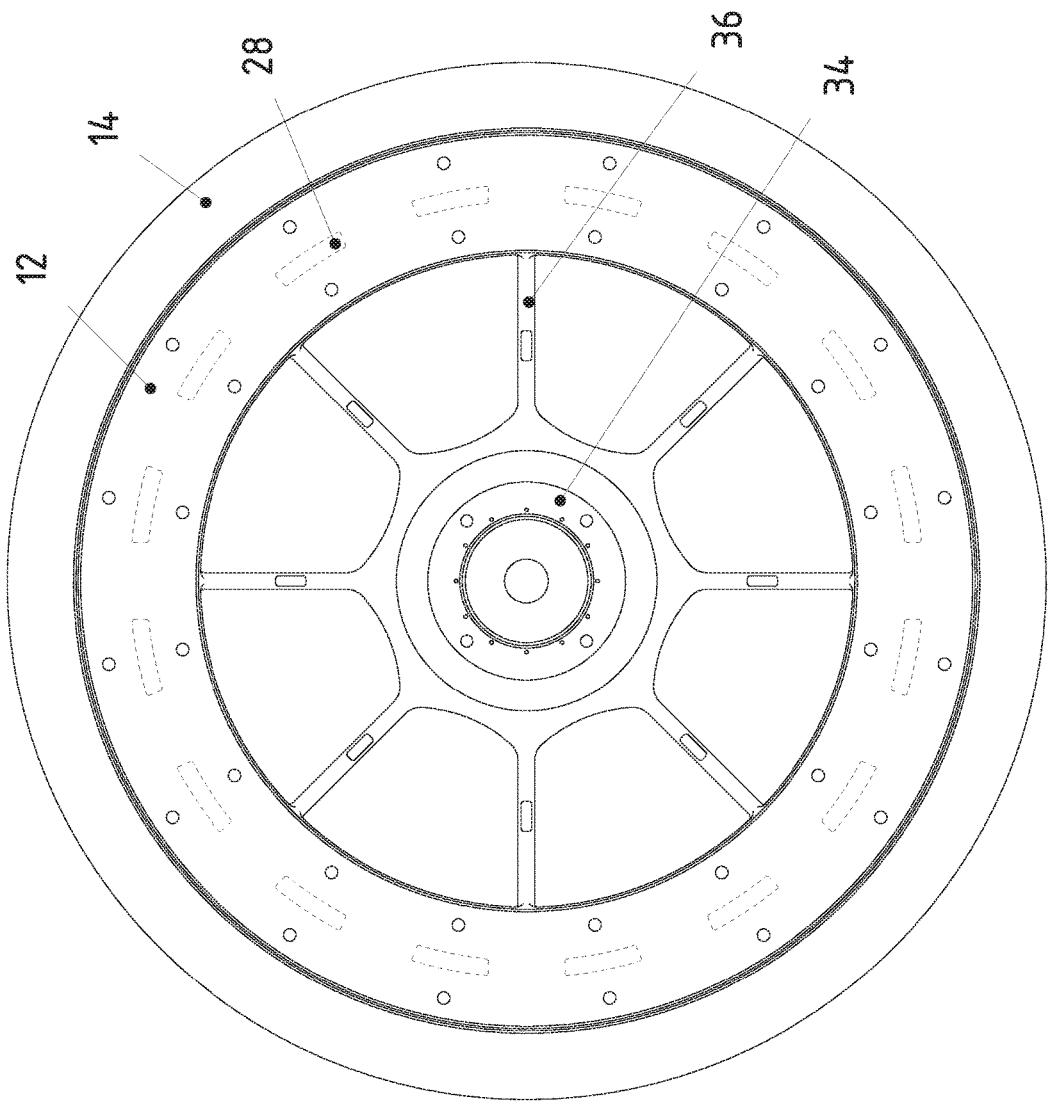

As can be seen in particular in FIG. 5, ribs 36 are provided, which extend outward in radial direction from the radial bearing dome 34 up to the annular disk 16. The ribs 36 are arranged at a uniform distance from one another around the radial bearing dome 34.

The ribs 36 serve to ensure a stability of the annular disk 16 in radial direction in order to, for example, prevent a tipping under load.

In an embodiment, which is not shown, the ribs are each formed as continuous strips, which are connected at their free end to the annular disk.

However, a stabilization of the annular disk in radial direction by means of continuous ribs usually influence the elastic properties of the annular disk in the bearing element. Thus, an increase in the number of ribs, on the one hand, leads to an increase in the tilt resistance of the annular disk and on the other hand, to a reduction in the elasticity of the bearing element in axial direction.

However, in a plurality of application areas, a relatively high elasticity of the bearing element 10 in axial direction is desired with a high safety against tilting of the annular disk 16.

As can be seen from FIG. 2, each rib 36 has a rib base 38 and a rib arm 40, which forms an extension of the rib base 38 on the side of the rib base 38 facing the radial bearing dome 34. The rib base 38 is fixed to the base element 14. The radial length of the rib base 38 is considerably less than the radius of the spacer element 18 so that the rib base 38 terminates at a considerable distance from the spacer element 18 within the spacer element 18.

The rib arm 40 is secured at one end to the upper region of the rib base 38 and, at the other end, to the annular disk 16, resulting in a passage 44 between the base element 14 and the rib arm 40.

In the lower region of the rib base 38, in which the rib base 38 is connected to the base element 14, a rib pedestal 42 is provided, which has curvatures on the free side walls of the ribbed base 38, which turn outwards, in particular in a concave fashion.

The number of the ribs 36 is smaller than the number of the openings 24 in the spacer 18.

In the embodiment of a bearing element 10 as illustrated in FIGS. 1 to 5, the ribs 36 are not designed as continuous strips, but have a rib arm 40, which forms a passage 44. The embodiment of a bearing element 10, as illustrated in FIGS. 1 to 5, thus offers the advantage of a relatively high elasticity in axial direction with a relatively high tilt safety of the annular disk 16.

Further, the axial elasticity of the bearing element 10 can be additionally influenced based on the type of formation of the rib arm 40 and/or of the passage 44 without significantly affecting the safety against tilting.

A further possibility of influencing the axial stiffness of the bearing element 10 is the positioning of the axial bearing segments 12 on the annular disk 16.

FIG. 1 shows an embodiment in which the axial bearing segments 12 are arranged above the pillar 28. In this embodiment, the bearing element 10 provides a relatively high axial stiffness.

In an alternative embodiment (not shown), the axial bearing segments are arranged above the opening 24, respectively. With this arrangement, the axial stiffness of the bearing element 10 is relatively low.

Naturally, the axial bearing segments can also be arranged in any other position on the annular disk 16, in which they are partly arranged on the pillar 28 and partly on the opening 24, in order to achieve the desired stiffness of the bearing.

FIG. 1 shows an embodiment, in which the number of the arches 22 corresponds to the number of the axial bearing segments 12. It is understood that the number of arches and the number of axial bearing segments 12 can be different.

The bearing element 10 can be part of a drive arrangement (not shown) for a grinding table and can be used in roller mills with directly driven grinding tables.

Alternatively, however, the bearing element according to the invention is also possible in roller mills, in which the grinding table is set in rotation by means of driven grinding rollers.

The bearing element 10, as described here, has a high axial elasticity at a small height in axial direction compared to previously known bearing elements. This is particularly advantageous when the maximum height of a mill is important.

Usually, the bearing element 10 is produced by means of a casting mould. Due to the separation of the bearing element in a base element 14, an annular disk 16 and a spacer element 18, the bearing element 10 can be easily produced and adapted to various requirements with regard to size and/or elasticity.

Should it be desired that the elasticity is to be changed whilst retaining the size, in particular the diameter of the bearing element, then it is sufficient to change only the part of the mould that influences the elasticity, such as the spacer element 18.

The arcade-shaped spacer element 18 renders it possible that the casting mould for the spacer element 18 can be formed from individual, easily producible modular mould elements.

The modular mould elements are usually easy to adapt to different requirements and can also be used with different base elements and/or annular disks.

The invention claimed is:

1. A bearing element suitable for supporting a grinding table in a roller mill, comprising
    a plate or disk-shaped base element,
    an annular disk,
    a spacer element and axial bearing segments, wherein the annular disk is disposed substantially parallel to the base element and spaced apart from the base element, and is connected at its bottom by means of an annular spacer element with the base element,
    characterized in that the annular disk has means on its upper side for receiving the axial bearing segments and that the spacer element is designed as an annular strip extending in the axial direction and has a plurality of spaced-apart arches in the circumferential direction, the openings of which point towards the base element.

2. The bearing element as claimed in claim 1, wherein the number of the arches of the spacer element corresponds to the number of axial bearing segments, which are secured on the annular disk.

3. The bearing element according to claim 1, wherein the plurality of spaced-apart arches are in the shape of arcades.

4. The bearing element according to claim 1, wherein the spacer element has at least one pillar, the length (u) of which is larger in the circumferential direction than the thickness (t) in radial direction.

5. The bearing element as claimed in claim 1, wherein the spacer element has at least one pillar with a side wall, which is enlarged towards the region of the base element.

6. The bearing element according to claim 5, wherein in the region of the base element the side wall of the at least one pillar is enlarged like an arch.

7. The bearing element as claimed in claim 1, wherein a radial bearing dome is provided on the base element.

8. The bearing element as claimed in claim 7, wherein a plurality of ribs is arranged around the radial bearing dome, the plurality of ribs extending in the radial direction from the radial bearing dome.

9. The bearing element according to claim 8, wherein a rib has a rib arm which turns away from the radial bearing dome and is connected to the annular disk.

10. A grinding table drive arrangement comprising a bearing element according to claim 1.

* * * * *